Figure 1:
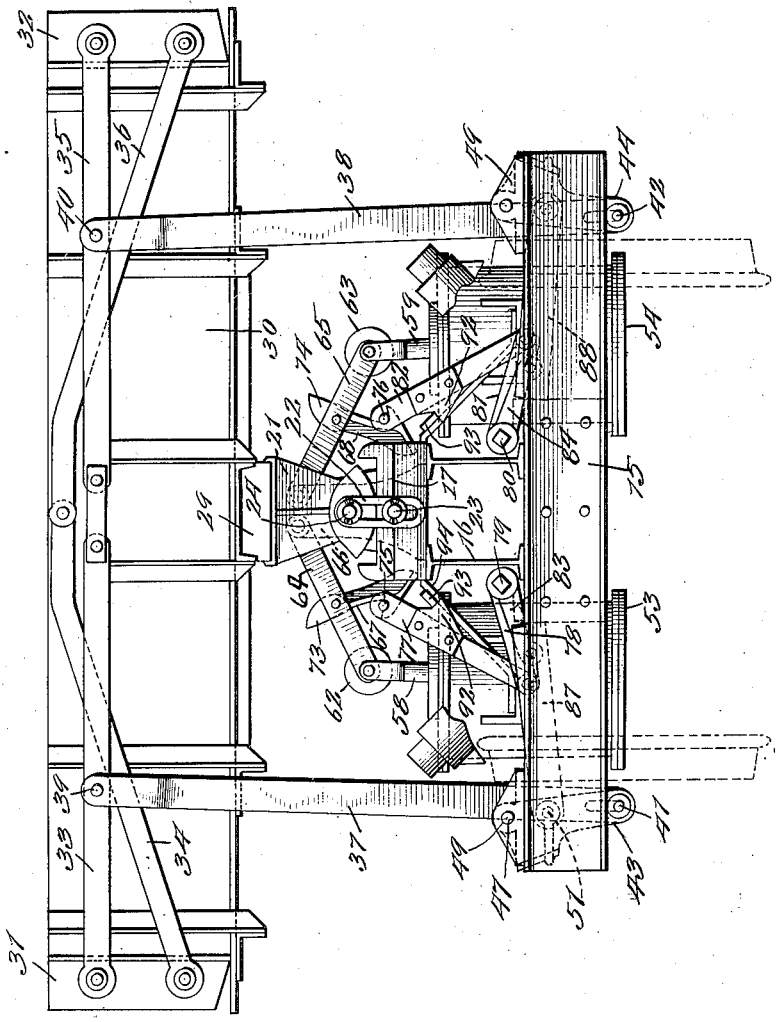

J. B. RHODES.
DUMP CAR.
APPLICATION FILED DEC. 28, 1911.

1,103,314.

Patented July 14, 1914.
7 SHEETS—SHEET 1.

Witnesses:

Inventor:
Jay B. Rhodes,

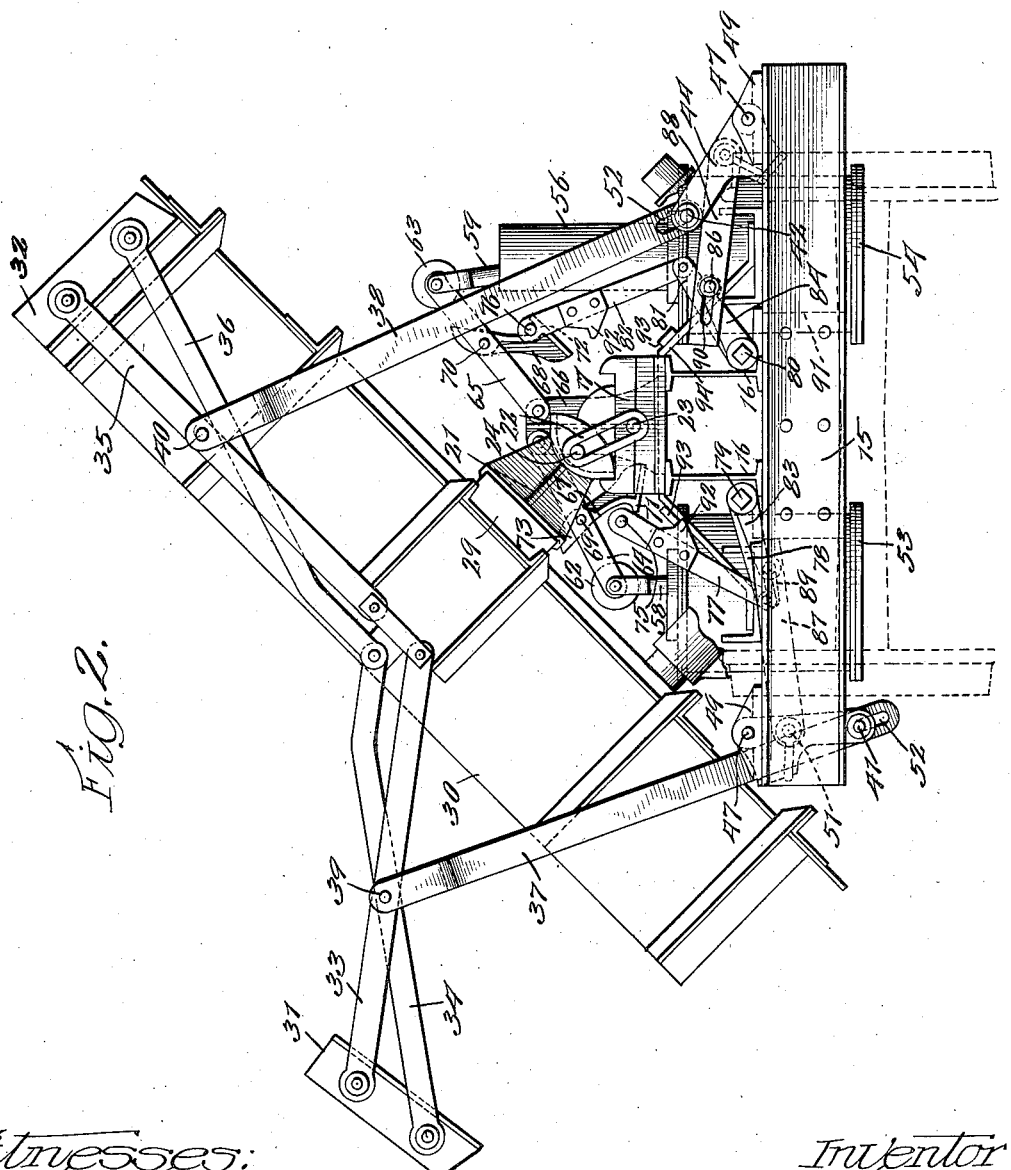

J. B. RHODES.
DUMP CAR.
APPLICATION FILED DEC. 28, 1911.
1,103,314.
Patented July 14, 1914.
7 SHEETS—SHEET 3.
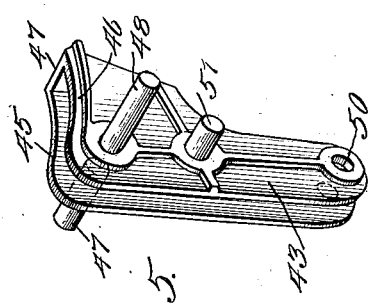
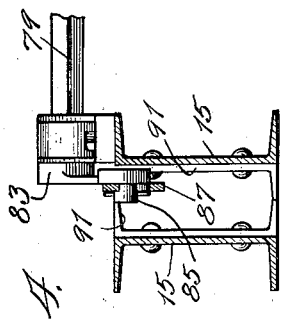
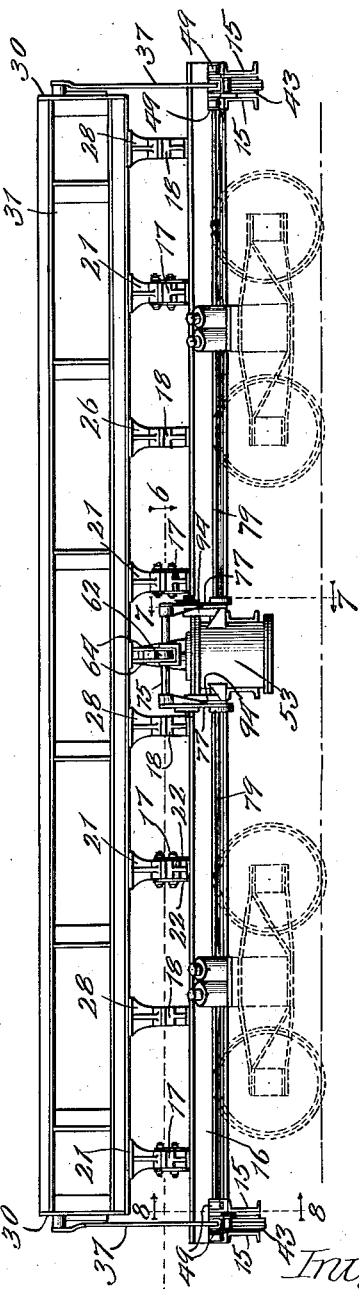

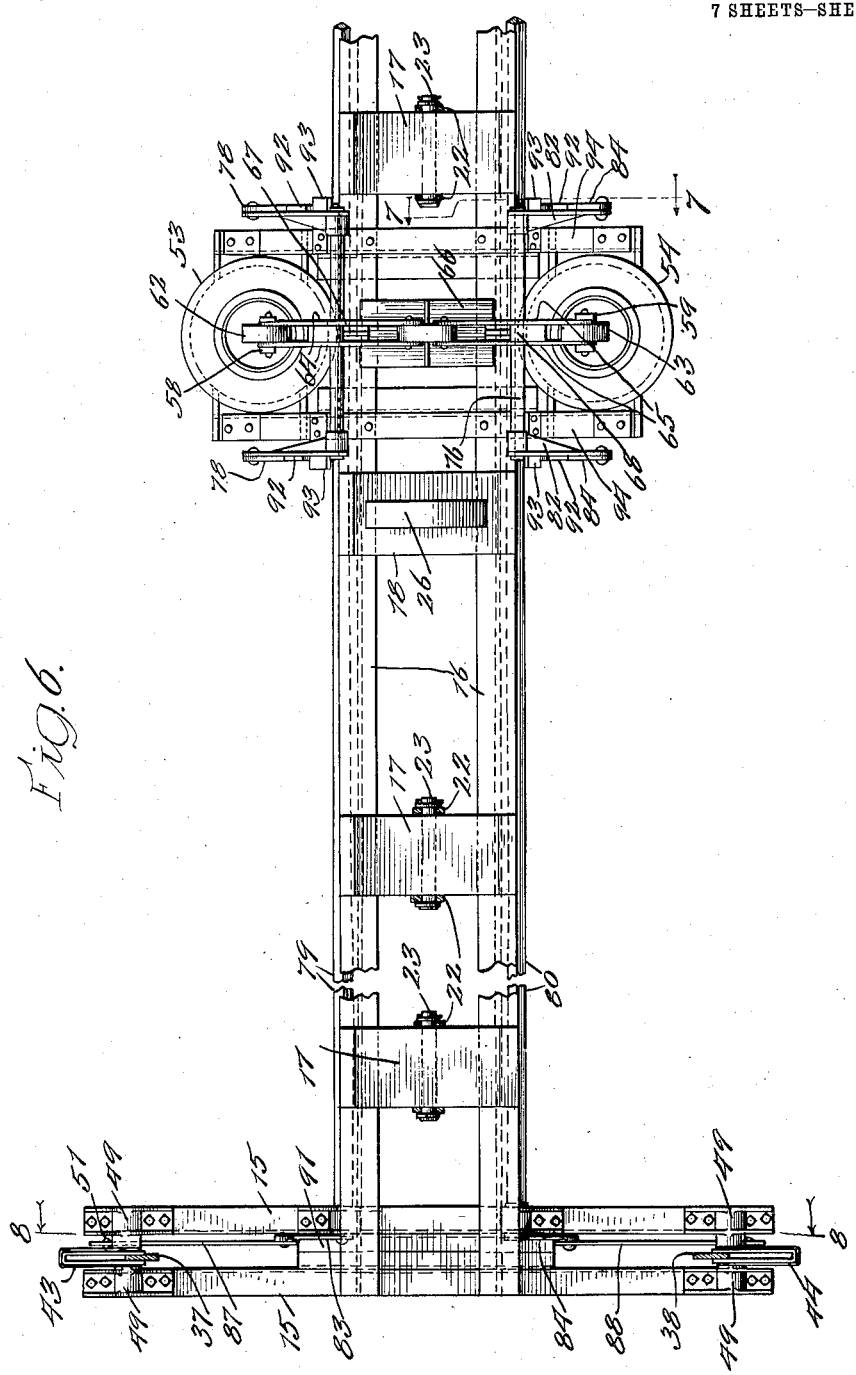

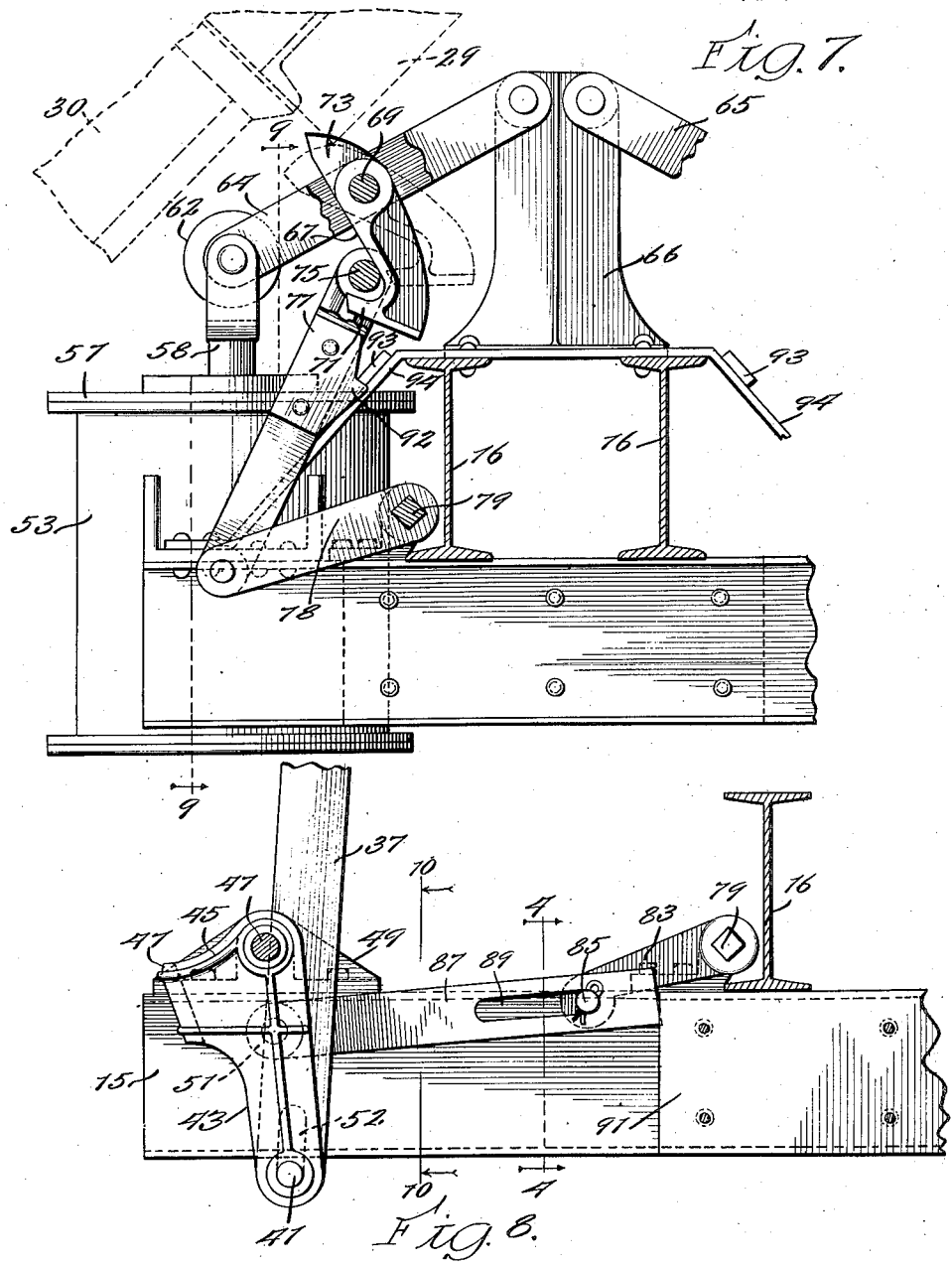

J. B. RHODES.
DUMP CAR.
APPLICATION FILED DEC. 28, 1911.
1,103,314.
Patented July 14, 1914.
7 SHEETS—SHEET 6.
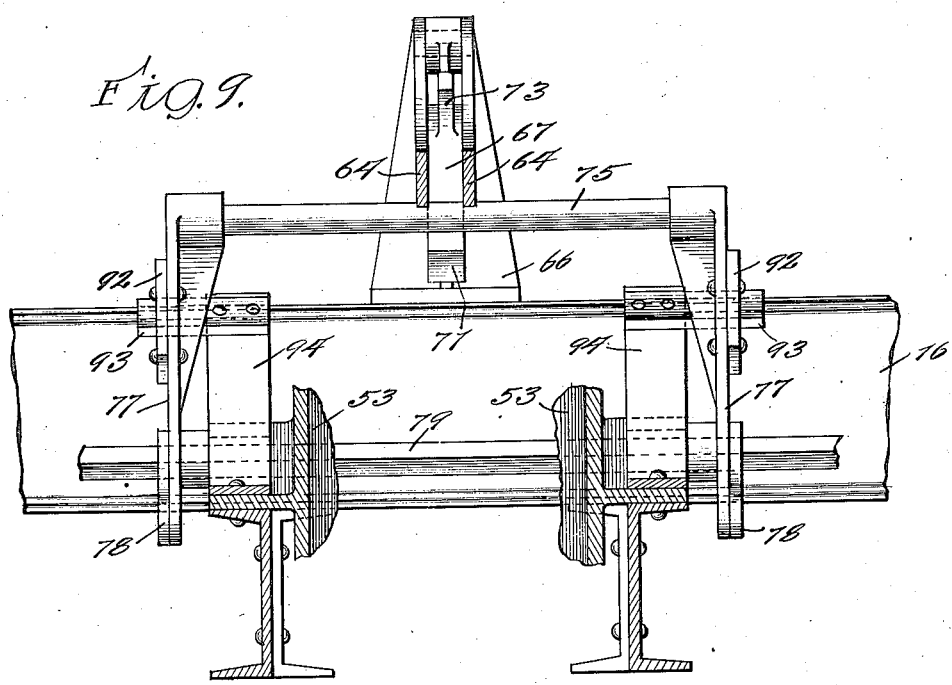
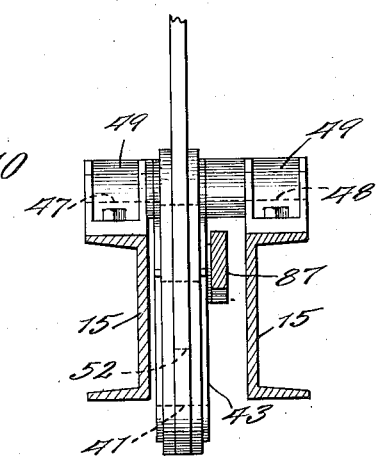

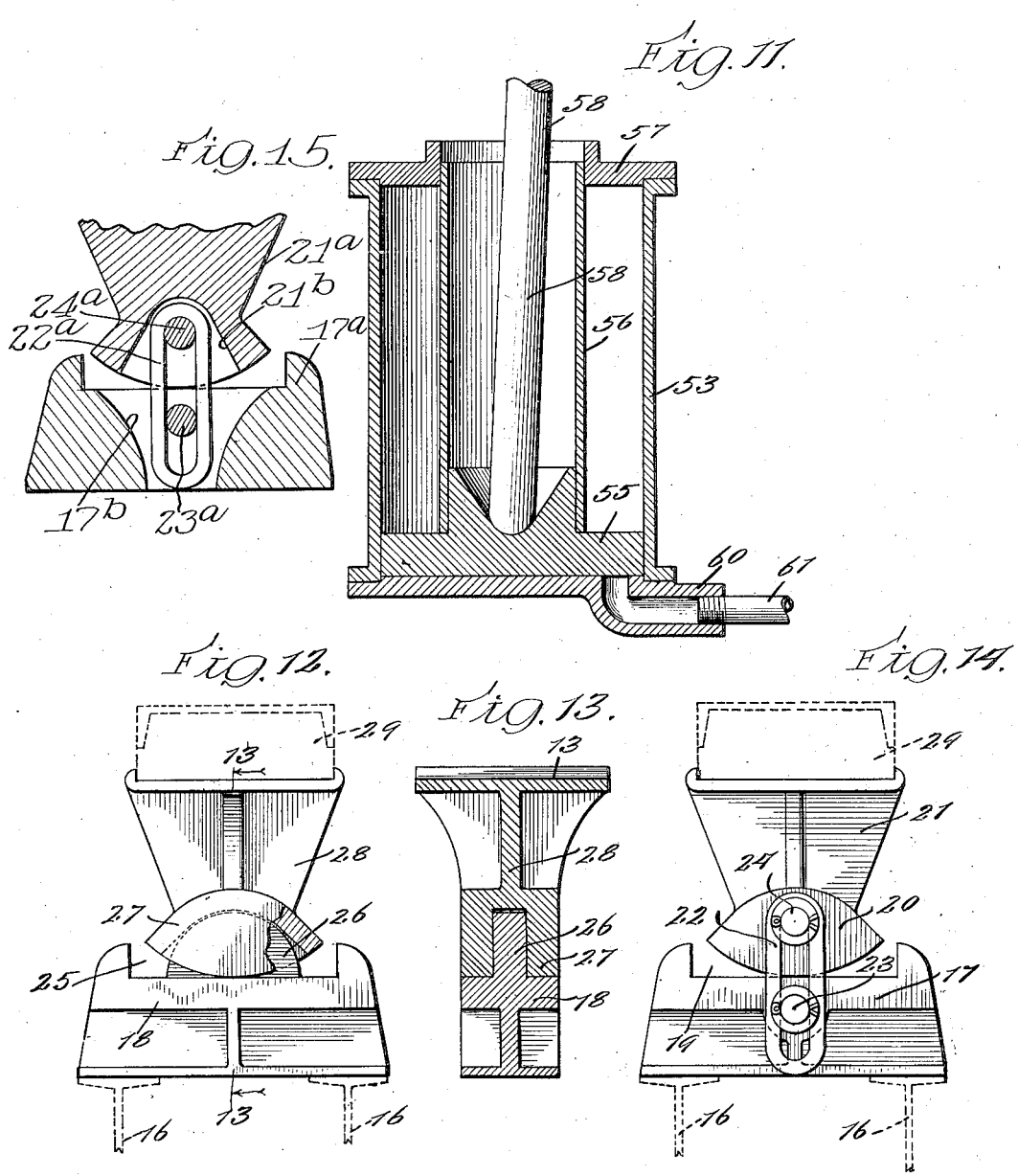

UNITED STATES PATENT OFFICE.

JAY B. RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

1,103,314.  Specification of Letters Patent.  Patented July 14, 1914.

Application filed December 28, 1911. Serial No. 668,342.

*To all whom it may concern:*

Be it known that I, JAY B. RHODES, residing at Kalamazoo, in the county of Kalamazoo and State of Michigan, have invented certain new and useful Improvements in Dump-Cars, of which the following is a specification, reference being had to the accompanying drawings.

My invention relates to dump cars of the type in which the car body or bed, provided with suitable side gates, is mounted on a suitable truck and is arranged to be tilted at either side of the car to discharge its load, the gate on the dumping side being automatically held up out of operative position while the car is in dumping position.

The principal objects of my present invention are to provide new and improved mechanism for tilting the car body to discharge its load; for restoring the car body to operative position; and for securing the car body in operative position when it is not desired to tilt it.

My invention also contemplates other improvements which will be hereinafter pointed out.

In the accompanying drawings, Figure 1 is an end view of my improved dump car showing it in operative position; Fig. 2 is a similar view showing the car tilted to discharge its load; Fig. 3 is a side view of the car showing it in operative position; Fig. 4 is an enlarged vertical cross-section taken on line 4—4 of Fig. 8; Fig. 5 is a perspective view of one of the stirrups or brackets by which the side-gate operating bars are supported; Fig. 6 is a partial horizontal section on line 6—6 of Fig. 3, some parts being broken away; Fig. 7 is an enlarged detail, being a partial cross-section on line 7—7 of Figs. 3 and 6, some parts being broken away; Fig. 8 is an enlarged detail, being a partial vertical cross-section on line 8—8 of Figs. 3 and 6; Fig. 9 is a vertical section on line 9—9 of Fig. 7, some parts being broken away; Fig. 10 is a vertical section on line 10—10 of Fig. 8; Fig. 11 is a vertical section of one of the cylinders by which the dumping is effected, showing the parts operating therein; Fig. 12 is an enlarged detail, partly broken away, showing one of the pairs of rockers upon which the car body is mounted; Fig. 13 is a vertical section on line 13—13 of Fig. 12; Fig. 14 is a view showing another form of rocker bearing which is also used to support the car body on the truck; and Fig. 15 is a view showing a modification of the bearing shown in Fig. 14.

In the embodiment of my invention illustrated, the car body or bed is mounted upon suitable bearings in the form of rockers, so constructed and arranged that the bed may be tilted at either side of the truck on which it is carried, such rockers being arranged to carry the bed over toward the dumping side when it is being tilted so that the bed may assume a sharper angle without striking the side of the truck. The side gates are pivotally connected with the end portions of the bed by swinging arms and are automatically operated when the bed is tilted so that on the tilting side the gate is held up out of operative relation to the bed to permit the free discharge of the load. The tilting of the bed, either to discharge its load or to restore it to normal position, is effected by means of compressed air operating in cylinders carried by the truck. Separate cylinders are employed for moving the bed in opposite directions, and in practice the several corresponding cylinders of the different cars of a train are connected by means of a train-pipe with each other and with a valve controlled by the engineer so that any desired car may be dumped singly or all the cars of the train may be similarly operated simultaneously.

In order to permit cars to be dumped singly, the several cars are provided with valves by which the compressed air may be cut off from the operating cylinders, and in practice the valves of all the cars which are not to be dumped are closed to cut their cylinders off from the train-pipe, leaving only the car to be dumped connected therewith, and consequently the admission of air to the train-pipe by the engineer effects the dumping of the connected car, leaving the others in operative position. Of course, any one or more cars may thus be dumped at the same time. Locking mechanism is provided for holding the bed in operative position in transporting the load and for preventing the bed from accidentally tipping over on the opposite side when being restored to normal position, and such locking mechanism is arranged to operate automatically either to lock the bed in normal position or to release it so that it may be dumped at the proper side of the train.

Referring to the drawings,—15 indicates the end beams and 16 the longitudinal beams which constitute the upper part of the frame of the truck, the end beams 15 being preferably channel-beams of steel or other suitable material, and the longitudinal beams being preferably I-beams. Two end beams 15 are provided at each end of the car, each pair being spaced a short distance apart to better provide for the mounting thereon of certain operating parts hereinafter described. The longitudinal beams 16 serve as supports for the lower members 17—18 of two sets of rocker-bearings upon which the car bed is supported as described. The members 17 are best shown in Figs. 3 and 14, from an inspection of which it will be seen that they are simply blocks having suitable recesses 19 in their upper surfaces which receive rockers 20 at the lower ends of brackets 21 which form the upper members of the rocker-bearings and directly support the car bed. The rockers 20 are prevented from getting out of the recesses 19 by links 22 at opposite sides of each rocker, as shown in Fig. 3, said links being fitted on pins 23 carried by the lower members and pins 24 carried by the rockers 20. These links permit a limited movement of the rockers 20 but prevent their displacement. In Fig. 15 I have shown a construction which possesses some advantages over the construction shown in Fig. 14, and which, in practice, I therefore prefer to use. In the construction shown in Fig. 15 the rockers 21$^a$ are provided with recesses 21$^b$ on their under sides which overlie recesses 17$^b$ in the supporting members 17$^a$. Pins 23$^a$ and 24$^a$ are provided in the recesses 17$^b$ and 21$^b$, respectively, and links 22$^a$ are fitted over said pins, as shown in Fig. 15. The recesses 17$^b$ and 21$^b$ are narrow so that they support the sides of the link 22$^a$, and the links therefore serve to prevent movement of the rockers endwise of the car, besides only a single link is used in each rocker instead of two, as in the construction shown in Fig. 14.

The members 18 of the second set of bearings are in some respects similar to the members 17, but are provided with recesses 25 having upwardly-projecting semi-circular tongues 26 adapted to fit into recesses in rockers 27 carried by brackets 28 which form the upper members of the second pair of rocker bearings. It will be seen that by this construction movement of the rockers 27 endwise of the car is prevented by the tongues 26. The brackets 21—28 are all connected to the central portion of the car bed by means of a beam 29 which extends longitudinally of the car at the under side thereof, as shown in Figs. 1 and 2, so that said bearings together cooperate to prevent lateral and longitudinal displacement of the bed with reference to the truck. Any desired number of such bearings may be employed, and the different bearings are preferably arranged alternately, as shown in Fig. 3. The rocker bearings above described are not claimed herein as they form the subject-matter of a divisional application filed April 1, 1912, Serial No. 687,647.

30 indicates the car bed, which, as shown in Figs. 1 and 2, is mounted on the several rocker bearings so that it may be tilted to discharge its load at either side of the truck.

31—32 indicate the two side gates, which are carried by pairs of straps 33—34—35—36, respectively, pivoted to the end portions of the bed and to the ends of the gates in the usual way.

37—38 indicate pairs of operating bars at opposite sides of the car for holding the proper side gate up out of operative relation to the bed when it is dumped at one side or the other, and also for assisting in holding the bed in operative position when loading or transporting the load. The operating bars 37—38 are connected at their upper ends with the bars 33—35, respectively, by pivots 39—40 and at their lower ends are pivotally connected by pivots 41—42 with stirrups or swinging brackets 43—44, respectively, which are pivotally connected at their upper ends with the outer end portions of the end beams 15 of the truck frame, as shown in Fig. 6. The construction of the several brackets or stirrups 43 is best shown in Fig. 5, wherein it will be seen that said stirrups are composed of two parallel side pieces 45—46 connected for a portion of their length by a web 47. The side pieces 45—46 are provided with oppositely-projecting trunnions 47—48 by which the stirrup is pivoted to the end beams 15 of the truck frame, as shown in Fig. 6, said beams having bearings 49 to receive said trunnions. As therein shown, each stirrup fits between the two end beams 15 which support it and they swing there-between, the lower ends of the side pieces 45—46 extending between the beams 15, as shown in Fig. 1. At the lower ends of the side pieces 45—46 holds 50 are provided to receive the pivots 41 which connect the operating bars 37—38 with their respective stirrups. One of the side pieces, as 46, is also provided intermediately with a laterally-projecting pivot 51 for connecting a locking-bar thereto, as will be hereinafter described.

It will be noted from an inspection of Figs. 1 and 2 that the lower ends of the operating bars 37—38 are provided with slots 52 to receive the pivot pins 41 and permit a limited movement of the operating bars 37—38 independently of said pins. The purpose of this arrangement will hereinafter appear.

53—54 indicate cylinders for tipping the bed to dump the load at one side or the other of the car and also for restoring the bed to operative position after it has been dumped. The construction of such cylinders is best shown in Fig. 11, from which it will be seen that each cylinder contains a piston 55 carried at the lower end of a sleeve 56 which is fitted in the upper end or head 57 of the cylinder. Piston-rods 58—59 rest upon the upper surface of the pistons, or are connected thereto, so that when the pistons rise in the cylinders the rods 58—59 are forced upward.

60 indicates an air-inlet communicating with the bottom of the cylinder and receiving air from a valved pipe 61 which is connected with the train-pipe. It will be understood that each car is provided with two cylinders, one of which is used to dump the bed at one side of the car and the other for dumping it in the opposite direction, and the like cylinders of each car are connected to a train-pipe controlled through suitable valve mechanism by the engineer so that the several cars of the train may be simultaneously dumped at the same side. The valve mechanism referred to not only controls the admission of air to the several sets of cylinders, but also permits of its being exhausted from the cylinders on the opposite side. This valve mechanism is not shown, as it is old and form no part of my present invention.

The piston-rods 58—59 carry at their upper ends rollers 62—63 which are adapted to bear against the under side of the bed when dumping the same or when returning the bed to its operative position after dumping, and the upper end portions of said piston-rods are connected, respectively, by links 64—65 with standards 66 which are supported by and rise from the longitudinal beams 16, as shown in Figs. 1 and 2.

67—68 indicate swinging latches or hooks, which are pivoted between their ends at 69—70, respectively, to the links 64—65, said latches having hooks 71—72 at their lower ends, their upper ends projecting above the links by which they are carried as best shown at 73—74 in Fig. 1. The positions of these parts when the bed is in its normal and in its dumping positions are shown in Figs. 1 and 2. It will be noted that when the bed is in its normal or carrying position the piston-rods 58—59 are in their lowermost positions so that the rollers 62—63 lie at a considerable distance from the bottom of the bed, and the upper ends 73—74 of the latches 67—68 are also out of contact with and at a considerable distance from the bed. When the bed is tilted to the left in dumping at that side of the car, it approaches closely to the roller 62 carried by piston-rod 58 and at the same time the center beam 29 strikes the upper end 73 of the latch 67 and swings the hook toward the center of the car. The object of this operation is to throw said latch out of operative position, for a purpose which will be hereinafter set forth.

75—76 indicate short rods which extend longitudinally of the car at opposite sides thereof in position to be engaged by the hooks 71—72 of the latches 67—68. The longitudinal center of the rod 75, for example, lies opposite the hook 71 and it is somewhat longer than the diameter of the cylinder 53 so that its ends are at opposite sides of said cylinder, as shown in Fig. 9.

77 indicates locking bars, the upper end portions of which are connected to the end portions of the rod 75, as shown in Fig. 9, their lower ends being connected with cranks 78 carried by a rock-shaft 79 which extends longitudinally of the car, being mounted in suitable bearings so that it is held securely in position but may be rocked. A corresponding rock-shaft 80 is provided at the opposite side of the car, as shown in Fig. 2, and carries cranks 81 connected to a similar pair of locking-bars 82 at the opposite sides of the car and connected by the rod 76 which coacts with latch 68. The rock-shafts 79—80 are provided near their ends with cranks 83—84, respectively, which are connected by pins 85—86 with the inner end portions of locking-bars 87—88, respectively, the outer end portions of which are connected with the pivots 51 of the stirrups 43—44, as shown in Figs. 6 and 8. The pins 85—86 are fitted in slots 89—90 in the locking-bars 87—88, respectively, so as to have a sliding connection therewith. By this construction by rocking the shafts 79—80 in the proper direction the cranks 83—84 will operate to lift the inner end portions of the locking-bars 87—88, as illustrated at the right in Fig. 2, and will also act to move them down into the position shown in Fig. 1 when the car bed is in its operative position. When the locking-bars 87—88 are in the latter position, their inner ends are arranged to abut against the outer ends of reinforcing plates 91 secured between the two end beams at each end of the car, as shown in Fig. 6, but when said locking plates are lifted in the manner described, they move out of engagement with said plates and are then free to move inward or toward the center of the car.

The locking bars 77—82 are provided with projections or teeth 92 which, when the parts are in the position shown in Fig. 1, are adapted to lie under and engage blocks 93, as best shown in Figs. 7 and 9, said blocks being carried by bars 94 or other suitable supports, as best shown in Fig. 9, but said teeth may be disengaged from said blocks by moving the upper ends of the locking bars 77 or 82 outward or away from the center of the car, as shown at the right in Fig. 2.

When the car is in its normal position, as shown in Fig. 1, it will be noted that both piston-rods 58—59 are in their lowermost or retracted position, the teeth 92 of the locking-bars 77—82 are in engagement with their respective blocks 93, the latches 67—68 are in engagement with the rods 75—76, and the locking bars 87—88 are in their lowermost position so that their inner ends abut against the ends of the plate 91. At this time, also, the pivots 41—42 at the lower ends of the side-gate operating bars are substantially in line with the pivots 47—48 of the stirrups 43 and pivots 51 which connect said stirrups with the outer ends of the locking-bars 87—88. At the same time the locking-bars 87—88 are held against inward movement by reason of the fact that their inner ends abut against the ends of the plate 91. Now, it will be apparent that to tilt the bed to dump the load at the left-hand side, for example, it is necessary for the side-gate operating bar 38 at the opposite side to move upward, as shown in Fig. 2, and that in order that it may move upward it is necessary for the lower end of the operating bar 38 to swing inward so as to rock its stirrup about the pivots 47—48 thereof. But with the parts in the position shown in Fig. 1 the lower end of said operating bar 38 cannot swing inward because it is held against such movement by the locking-bar 88. For a like reason, the bed cannot be tilted in the opposite direction as it is held against such movement by the locking-bar 87. It follows that with the parts in the position shown in Fig. 1 the bed is held against rocking in either direction. At the same time, the rock-shafts 79—80 are locked so that they cannot rock by means of the locking-bars 77—82, the teeth of which are then in engagement with their respective blocks 93. If, now, it is desired to dump the load to the left, air is admitted to cylinder 54 at the right-hand side of the car, forcing its piston upward into engagement with the bottom of the bed and lifting the right-hand side of the bed so as to cause it to rock and tip to the left. When the piston 59 begins to rise, it swings the outer end of the connecting rod 65 upward, thereby lifting the latch 68 carried thereby and moving it outward slightly, thus carrying the upper end of each locking-bar 82 outward and releasing its tooth from the block 93. The locking-bars 82 are also carried upward by the continued movement of the piston-rod, thereby lifting the cranks 81 and rocking the shaft 80 so as to carry the cranks 84 upward and thereby lift the locking bars 88 out of operative engagement with the plate 91. This permits the lower ends of the operating bars 38 to swing inward and to rise, thereby enabling the car bed to be tilted. The side gate at the opposite side of the car is held up by the operating-bars 37 in the manner shown in Fig. 2. The movement described continues until the end of the dumping operation, when the parts assume the position shown in Fig. 2. At this time—that is to say, at approximately the end of the tilting operation—the center beam 29 strikes the upper end 73 of the latch 67 and throws its hook 71 out of engagement with the rod 75.

When the bed is to be restored to operative position, the air is permitted to exhaust from cylinder 54 and is admitted to cylinder 53, thereby moving the piston-rod 58 upward or outward and lifting the connecting rod or link 64 so as to carry the hook 71 of the latch 67 beyond the rod 75. This takes place before the roller 62 acts to lift the car body appreciably, as some lost motion is provided for. The disengagement of the latch 67 with the rod 75 at this stage of the operation leaves the teeth of the locking-bars 77 in operative engagement with the block 93 at that side of the car, thereby leaving the rock-shaft 79 locked against rotation and holding the locking-bar 87 in operative position. The result is that the car bed cannot go beyond its operative position, since when it reaches that position, further movement is prevented by the operating-bar 37 at the left-hand side of the bed. The bed, therefore, is restored to its normal or operative position and remains locked in such position by the return of the several parts to the position shown in Fig. 1 incident to the movement of the bed into horizontal position.

It will be seen from the foregoing that the bed is normally locked in position to receive its load, but that the admission of air to either cylinder for dumping purposes automatically releases the appropriate locking devices so that the load can be dumped at the desired side, without, however, releasing the locking devices which control the tilting of the bed in the opposite direction; and, furthermore, that the admission of air to either cylinder to restore the bed to its normal position effects such operation without releasing the locking mechanism which prevents the tilting of the bed at the opposite side, and consequently there is no danger of swinging the bed over beyond its horizontal position when restoring it after dumping.

An important advantage of my improved construction is that the use of chains at the sides of the car for holding it in operative position is avoided and all the movements of the bed may be controlled by the engineer in the cab, which is not true when chains or equivalent devices are employed, as they have to be released or applied by hand.

It will be noted that the position and arrangement of the cylinders, the number of cylinders, and the fluid used for actuating the dumping and restoring mechanism, and other details of the construction shown, may be varied, as, except in so far as they are hereinafter claimed, they are not essential to the generic invention, which contemplates the use of such equivalents as would occur to the mechanic skilled in the art.

That which I claim as my invention, and desire to secure by Letters Patent, is,—

1. A dump-car, comprising a truck, a bed mounted on said truck and adapted to tilt to discharge its load, a bar pivotally connected with the bed at one side of the center thereof and depending therefrom, a swinging member connecting the lower end portion of said bar with the truck, compressed air operated mechanism for tilting the bed, and means actuated by said compressed air operated mechanism for swinging said swinging member to permit longitudinal movement of said depending bar.

2. A dump-car, comprising a truck, a bed mounted on said truck and adapted to tilt to discharge its load, a bar pivotally connected with the bed at one side of the center thereof and depending therefrom, a bracket suspended from the truck and having its free end pivotally connected with the lower end portion of said bar, compressed air operated mechanism for tilting the bed to discharge its load, and means actuated by said compressed air operated mechanism for swinging said bracket to permit longitudinal movement of said bar when the bed is being tilted.

3. A dump-car, comprising a truck, a bed mounted on said truck and adapted to tilt to discharge its load, a bar pivotally connected with the bed at one side of the center thereof and depending therefrom, a stirrup pivotally supported at its upper end by the truck and pivotally connected at its lower end with said bar, compressed air operated mechanism for tilting the bed to discharge its load, and means connected with said stirrup and actuated by said compressed air operated mechanism to swing the same laterally when the compressed air operated mechanism is operated to tilt the bed.

4. A dump-car, comprising a truck, a bed mounted on said truck and adapted to tilt to discharge its load, a bar pivotally connected with the bed at one side of the center thereof and depending therefrom, a stirrup pivotally supported at its upper end by the truck and pivotally connected at its lower end with said bar, compressed air operated mechanism for tilting the bed to discharge its load, a bar connected with said stirrup for normally holding the same against lateral movement, and means actuated by said compressed air operated mechanism for moving the latter bar to swing said stirrup laterally and permit endwise movement of said depending bar when the bed is to be tilted.

5. A dump-car, comprising a truck, a bed mounted on said truck and adapted to tilt to discharge its load, a bar pivotally connected with the bed at one side of the center thereof and depending therefrom, a laterally swinging bracket pivotally mounted at its upper end upon the truck, its free end being connected with said depending bar, a locking bar connected at one end with said bracket and adapted to engage a suitable stop to prevent lateral movement of said bracket, compressed air operated mechanism for tilting the bed, and means actuated by said compressed air operated mechanism for moving said locking bar to swing said bracket laterally when the bed is to be tilted.

6. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, an upwardly-swinging locking bar pivotally connected with said bracket, a crank connected with said locking bar, compressed air operated mechanism for tilting the bed, and means actuated by said compressed air operated mechanism when the same is actuated to tilt the bed to swing said crank.

7. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, an upwardly-swinging locking bar pivotally connected with said bracket, a crank connected with said locking bar, compressed air operated mechanism for tilting the bed, means actuated by said compressed air operated mechanism when the same is actuated to tilt the bed to swing said crank, means for normally holding said crank against movement, and means actuated by said compressed air operated mechanism when the same is actuated to tilt the bed for releasing said crank.

8. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, an upwardly-swinging locking bar pivotally connected with said bracket, a crank connected with said locking bar, compressed air operated mechanism for tilting the bed, means actuated by said compressed air operated mechanism, when the same is actuated to tilt the bed, to swing said crank, means for normally locking said crank against movement, means actuated by said compressed air operated mechanism when the same is actuated to tilt the bed for releasing said crank, and means operated by the tilting of the bed in the proper direction to disconnect said compressed air operated mechanism from said locking mechanism so that the compressed air operated mechanism may be actuated to restore the bed to its normal position without relasing said lock.

9. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, compressed air operated mechanism for tilting the bed, a crank connected with said bracket for moving the same laterally, and means operated by said compressed air operated mechanism, when the same is actuated to dump the car, for swinging said crank.

10. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, compressed air operated mechanism for tilting the bed, a crank connected with said bracket for moving the same laterally, means operated by said compressed air operated mechanism when the same is actuated to dump the car for swinging said crank, means for normally locking said crank against movement, and means connecting said crank with said compressed air operated mechanism and actuated to release said locking mechanism when the compressed air operated mechanism is actuated to dump the car.

11. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, compressed air operated mechanism comprising a cylinder and piston for tilting the bed, a swinging link connected with said piston and with the truck, a latch carried by said link, a crank mounted on the truck and connected with the bracket for swinging the same laterally, and a locking bar connected with said crank and adapted to be engaged by said latch, whereby when the piston is operated to dump the car said crank will be swung to move said bracket laterally.

12. A dump-car, comprising a truck, a bed mounted on said truck and adapted to tilt to discharge its load, a bar pivotally connected with the bed at one side of the center thereof and depending therefrom, a laterally-swinging bracket pivotally mounted at its upper end upon the truck, its free end being connected with said depending bar, compressed air operated mechanism comprising a cylinder and piston for tilting the bed, a swinging link connected with said piston and with the truck, a latch carried by said link, a crank mounted on the truck and connected with the bracket for swinging the same laterally, and a bar connected with said crank and adapted to be engaged by said latch, whereby when the piston is operated to dump the car said crank will be swung to move said bracket laterally, said latch being adapted to be swung to release the latter bar when the bed is tilted in the proper direction.

JAY B. RHODES.

Witnesses:
 JOHN L. JACKSON,
 MINNIE A. HUNTER.